Jan. 22, 1952   A. C. PARLINI ET AL   2,583,442
PICTURE VIEWER MECHANISM

Filed May 10, 1949   7 Sheets-Sheet 1

INVENTORS
ALEXANDER C. PARLINI
EUGENE HASCHER
BY   HEINZ RECHER

D. Malcolm
ATTORNEY

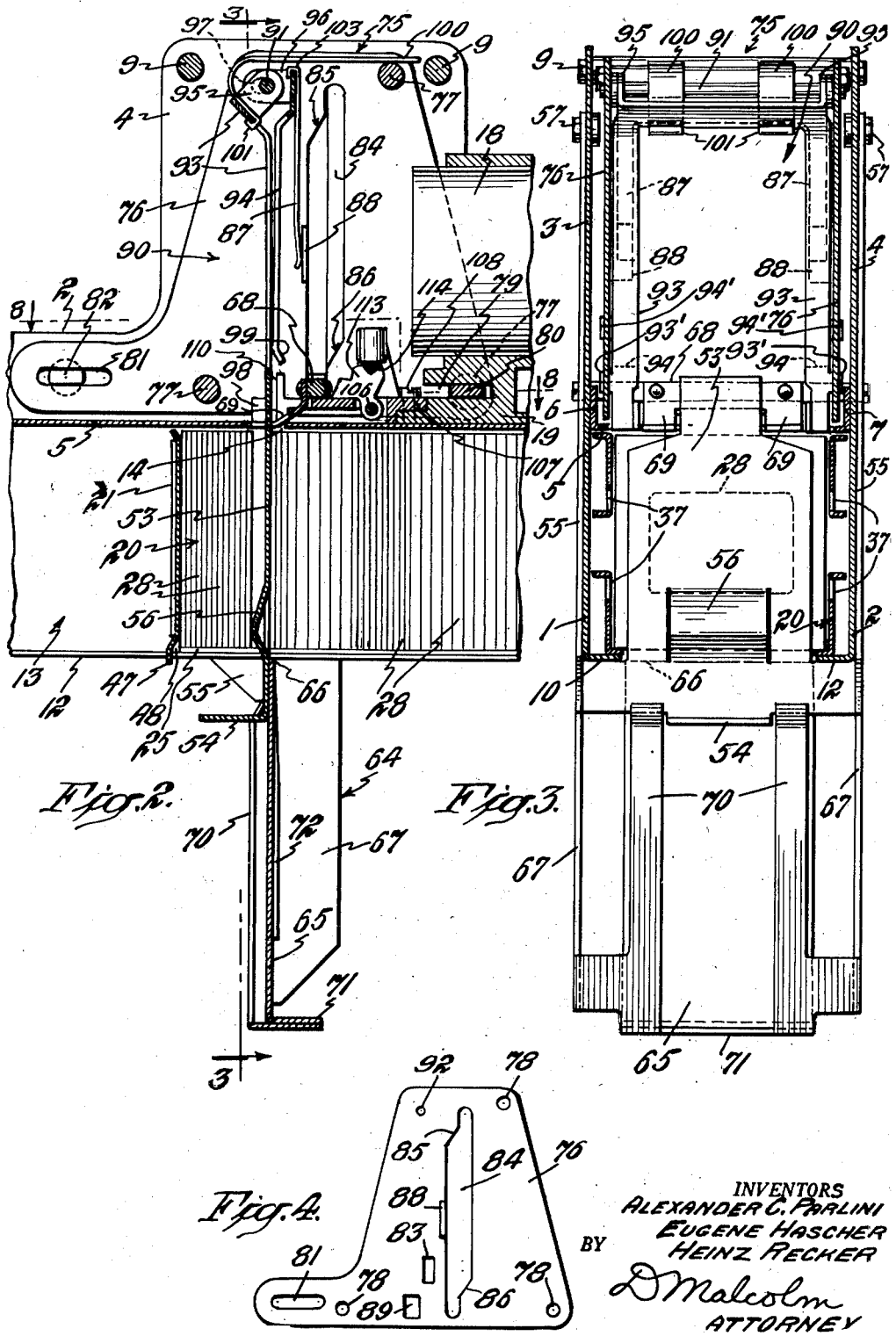

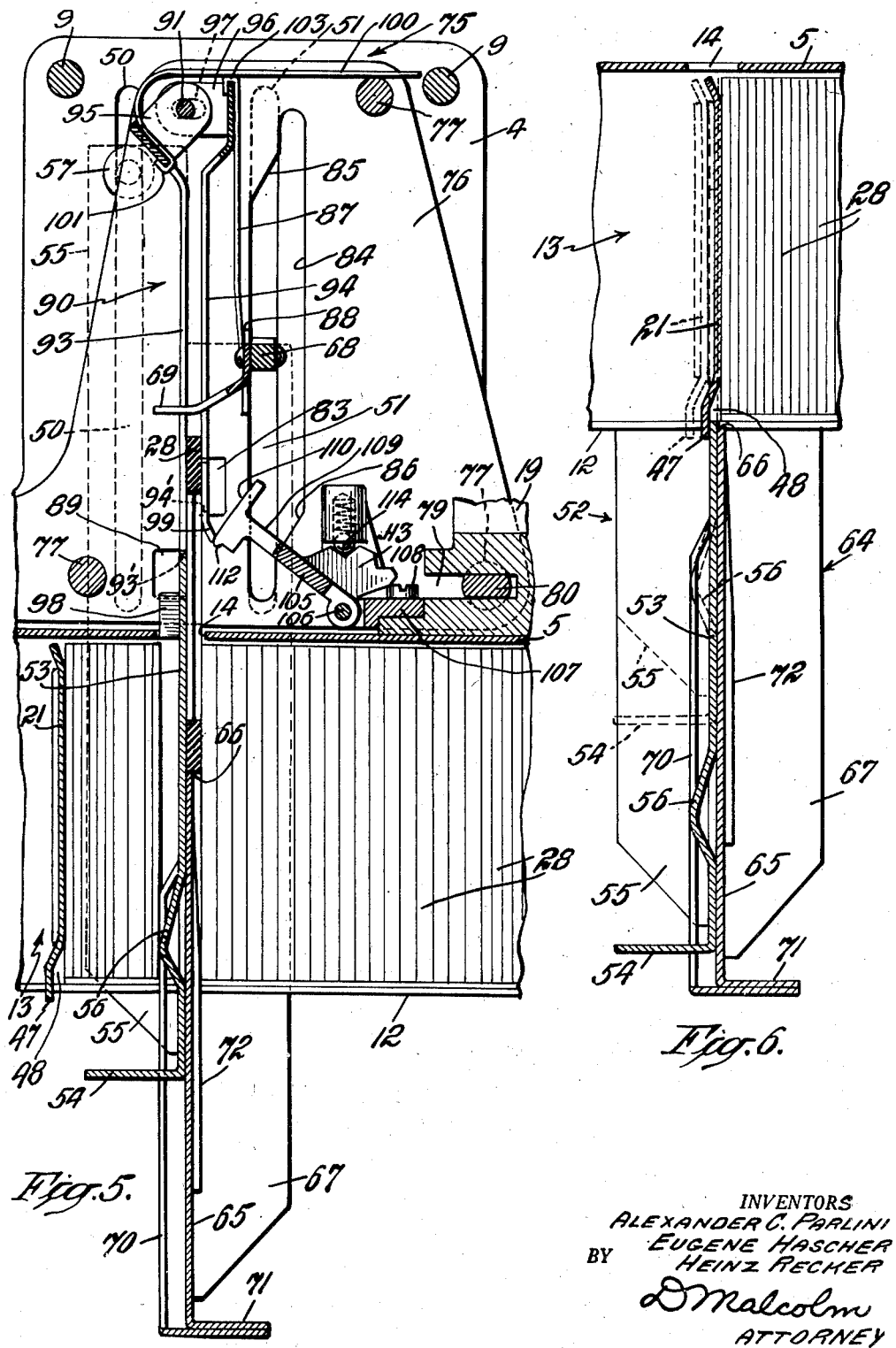

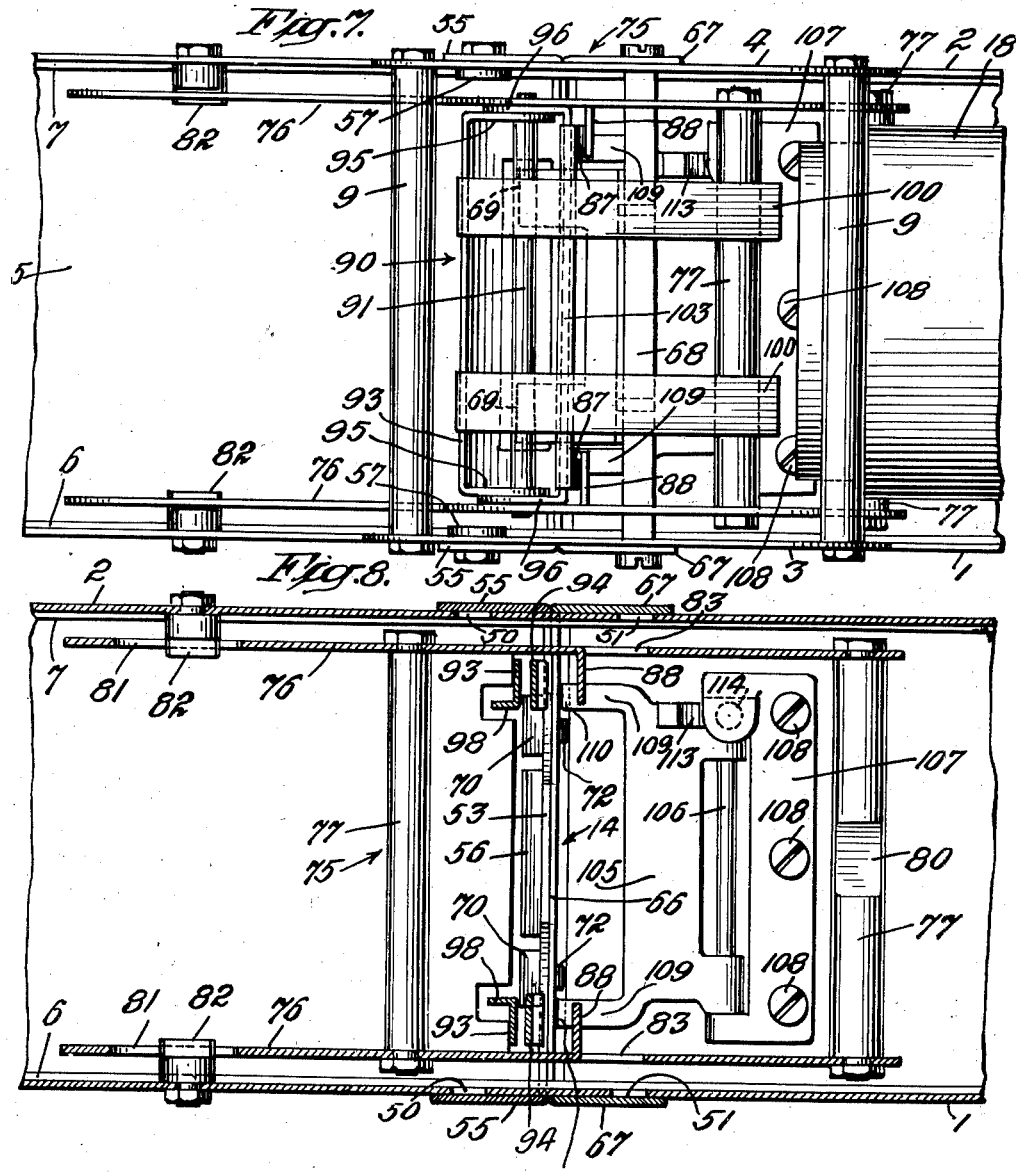
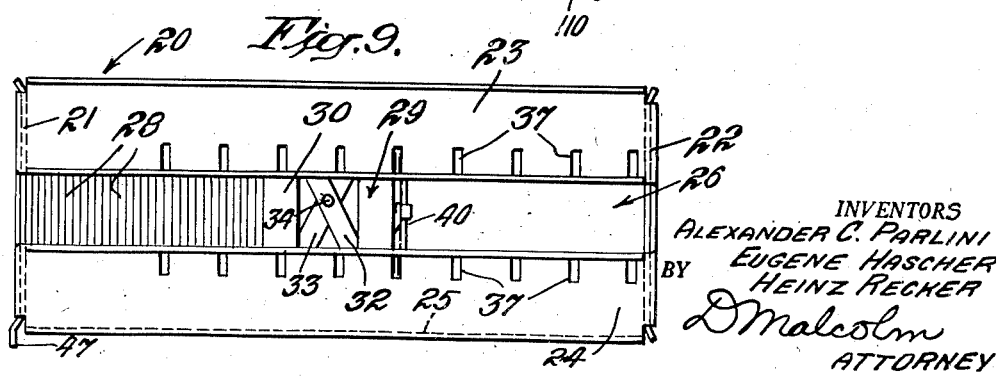

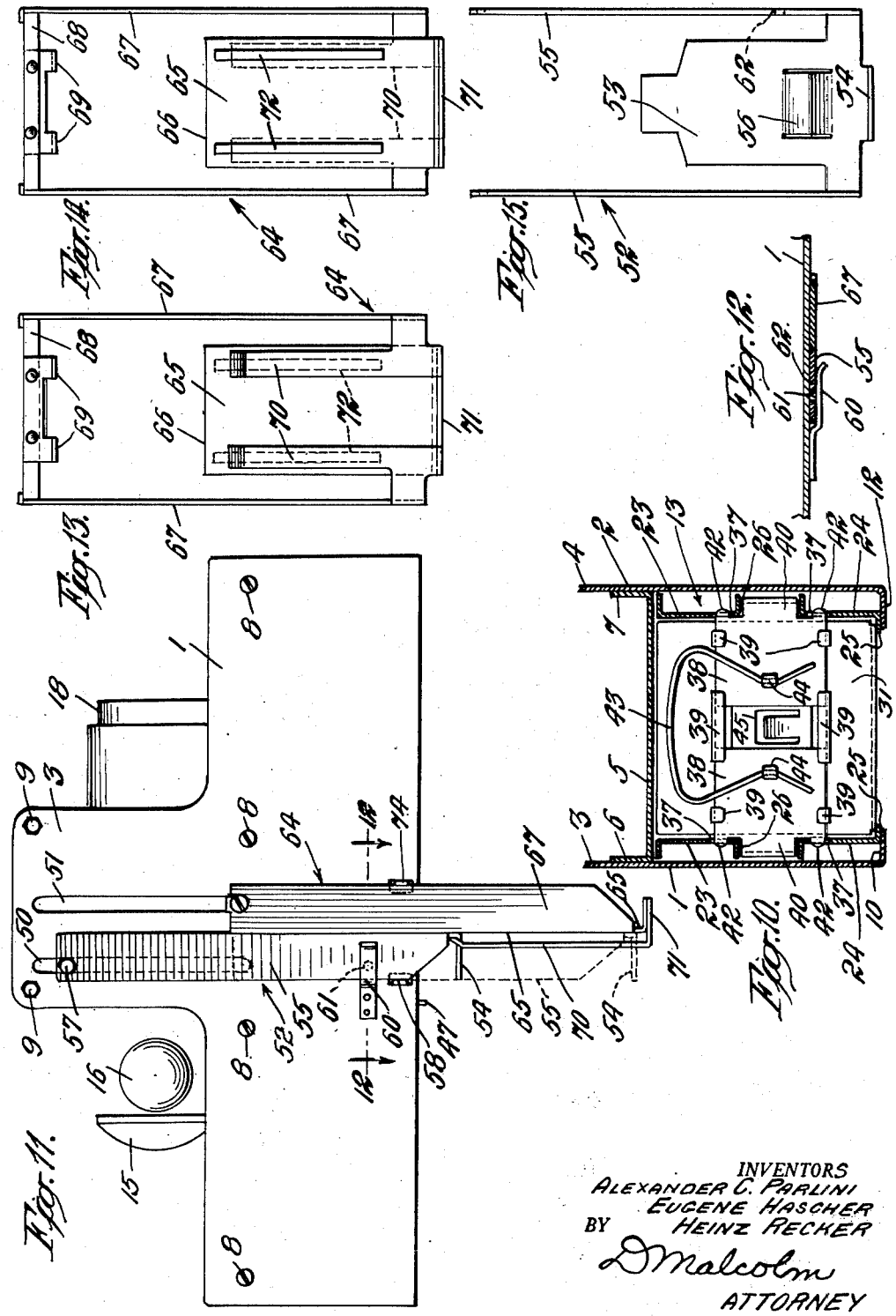

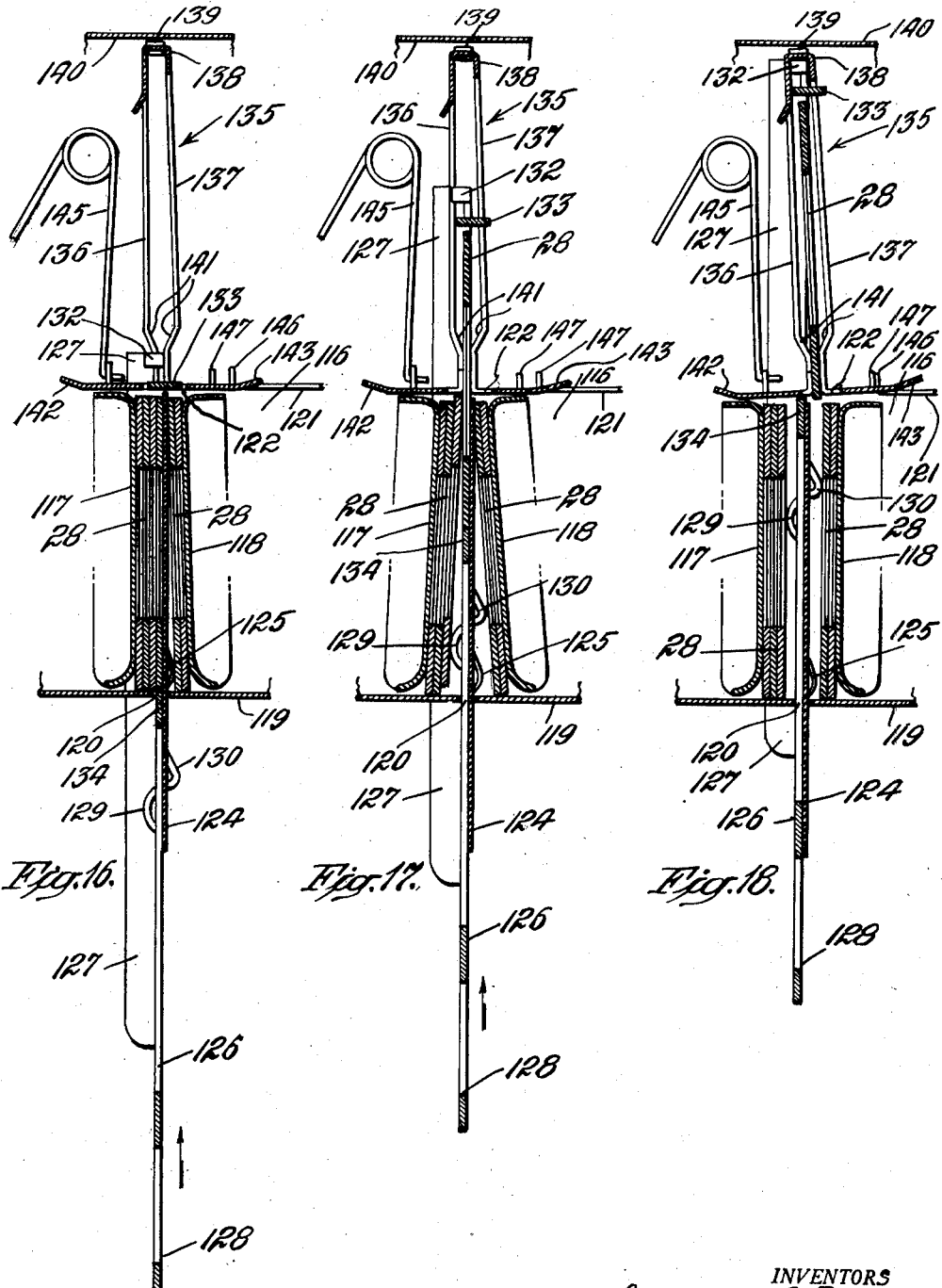

Jan. 22, 1952 A. C. PARLINI ET AL 2,583,442
PICTURE VIEWER MECHANISM
Filed May 10, 1949 7 Sheets-Sheet 7
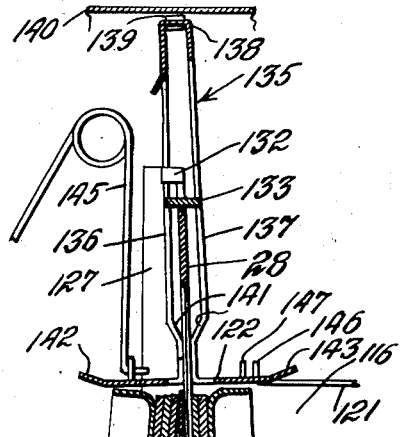
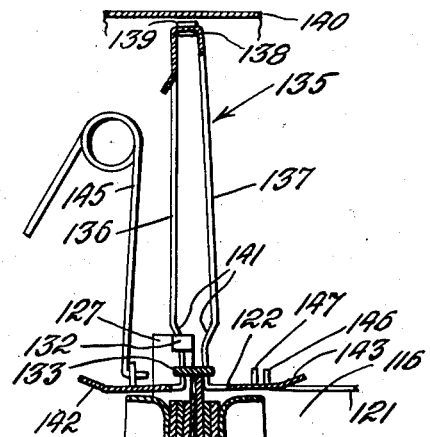
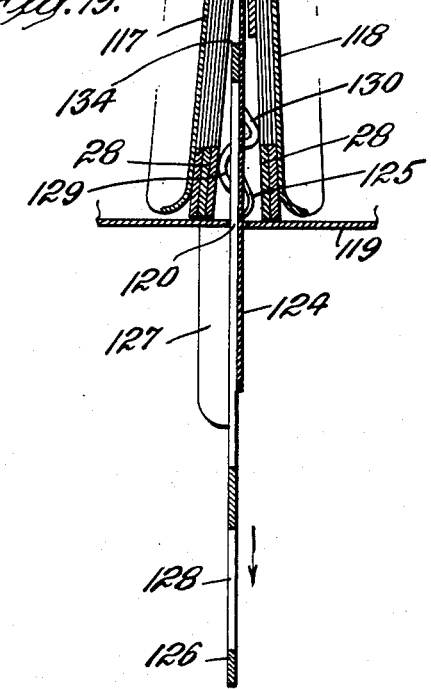
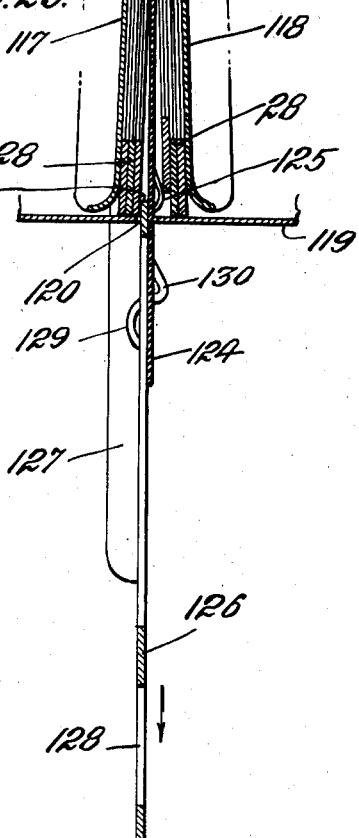
INVENTORS
ALEXANDER C. PARLINI
EUGENE HASCHER
BY HEINZ RECKER
D. Malcolm
ATTORNEY Patented Jan. 22, 1952

2,583,442

UNITED STATES PATENT OFFICE 2,583,442

PICTURE VIEWER MECHANISM

Alexander C. Parlini, Freeport, N. Y., and Eugene Hascher, Irvington, and Heinz Recker, Ridgewood, N. J., assignors to Empire State Laboratories, New York, N. Y., a partnership Application May 10, 1949, Serial No. 92,264

20 Claims. (Cl. 40—79)

This invention relates to apparatus for viewing pictures such as Kodachrome, Dufay color and other positive transparencies, either directly or by projection upon a screen, and it has for its object to provide a novel and improved device for this purpose.

Another object of the invention is to provide an improved picture or transparency viewer which is adapted to receive a plurality of pictures in a single loading, and present them successively to view by a simple manual operation by the user.

Another object is to provide a viewer of the above type which will accommodate pictures of various thicknesses without distorting the pictures or clogging the instrument, even though the pictures are stacked indiscriminately without regard to thickness.

Another object is to provide a viewer having a picture magazine or tray containing a stack of pictures, such as pictures relating to a common subject, which may be inserted in the instrument and removed therefrom as a unit, so that groups of pictures representing any desired subject may be stored intact, each group in its own magazine, ready for use when required.

A further object is to provide a picture magazine for an instrument of the foregoing type which may be instantly adjusted to accommodate any desired number of pictures up to the limit of its capacity, so that the number or sequence of pictures in a magazine may be varied at will before exhibiting same.

Another object is to provide a viewer of the type referred to, having a manually operated picture slide and associated mechanisms which select the pictures one by one from the magazine and present them to the optical viewing or projecting field in prearranged sequence, and then return the pictures to the magazine in the same sequence as before.

Still another object is to provide a compact, relatively inexpensive viewing instrument of the above type having novel and improved details of construction and features of operation.

Various other objects and advantages will be apparent as the nature of the invention is more fully disclosed.

Transparent photographs, either in color or in black and white, are customarily framed in cardboard or plastic mounts, and one method of exhibiting such transparencies is to insert them, one at a time, into a "viewer" containing an eyepiece or lens through which the picture can be viewed when the instrument is held up to the light.

In our copending application, Serial No. 674,796, filed June 6, 1946, now Patent 2,513,102, issued June 27, 1950, we disclose a viewer which holds a large number of pictures, stacked therein like a deck of cards; and a manually operated reciprocating slide selects said pictures one by one, presents them individually to view, and then conveys each viewed picture to a storage compartment where it is automatically stacked with the preceding pictures in the same position which it occupied in the original stack.

The present invention embodies a number of important improvements on the apparatus disclosed in the above-mentioned application. A particular advantage of our improved viewer resides in its ability to readily accommodate pictures of various thicknesses, since the cardboard and plastic picture mounts now on the market vary greatly in thickness, and the home-made mounts devised by some amateur photographers are also far from uniform.

In our improved instrument a reciprocable picture slide conveys the individual pictures into a skeleton frame which is not only flexible so that it accommodates pictures of various thicknesses and holds them firmly in the proper viewing position, but this frame, furthermore, is automatically shifted by the reciprocable picture slide so that the mouth of the frame will always be in the proper position to register with and receive an incoming picture, or to guide and disgorge an outgoing picture, without distorting same. This feature of the invention is important even if the pictures happen to be of uniform thickness, because it prevents the pictures from being bent or otherwise distorted and thus avoids accidental catching of the pictures and clogging of the machine.

Another feature of the invention resides in the construction of the picture magazine which is adapted to hold any desired number of pictures up to the limit of its capacity, and includes an adjustable device which holds the pictures snugly in place and exerts spring pressure on the stack of pictures to insure the proper presentation of each succeeding picture into the path of the reciprocable slide which conveys it to the viewing position, as hereinafter more fully described.

Although the novel features which are characteristic of this invention are set forth more in detail in the claims appended hereto, the nature and scope of the invention may be better understood by referring to the following description, taken in connection with the accompanying drawings forming a part thereof, in which certain specific embodiments have been set forth for purposes of illustration.

In the drawings:

Fig. 2 is an enlarged vertical sectional view in the same general plane as Fig. 1, showing the picture magazine containing pictures of various thicknesses, and the mechanisms for shifting same into and out of viewing position;

Fig. 3 is a transverse vertical sectional view taken on line 3—3 of Fig. 2;

Fig. 4 is a plan view of one of the two side plates of the shiftable frame which holds the individual pictures in viewing position;

Fig. 5 is an enlarged longitudinal vertical section similar to Fig. 2, but with the parts in the position they occupy when a relatively thick picture begins to ascend from the magazine into the viewing position;

Fig. 6 is a longitudinal vertical section showing the chamber containing the picture magazine, the divider plate and the reciprocable picture slide, with the parts in the position they occupy when the picture magazine is first inserted into the instrument;

Fig. 7 is a top plan view of the apparatus shown in Fig. 1, with portions of the projecting system omitted;

Fig. 8 is a horizontal section taken on line 8—8 of Fig. 2;

Fig. 9 is a side view of the picture magazine containing a stack of pictures;

Fig. 10 is a transverse section through the magazine of Fig. 9, illustrating the mechanism for adjusting the pressure on the stack of pictures to hold them snugly in the magazine;

Fig. 11 is a side view of the apparatus, on a smaller scale than in Fig. 1;

Fig. 12 is a transverse section on line 12—12 of Fig. 11, showing a spring detent for locking the divider plate in elevated position during the operation of the instrument;

Fig. 13 is a plan view of the reciprocable picture slide, as seen from the left in Figs. 1, 2, 5 and 6;

Fig. 14 is a plan view of the opposite face of said reciprocable picture slide;

Fig. 15 is a plan view of the divider plate, as seen from the left in Figs. 1, 2, 5 and 6; and Figs. 16 to 20, inclusive, are diagrammatic views illustrating a single modification of the invention, with the moving parts in various positions during the raising and lowering of the pictures to and from the viewing position.

Figure 1:
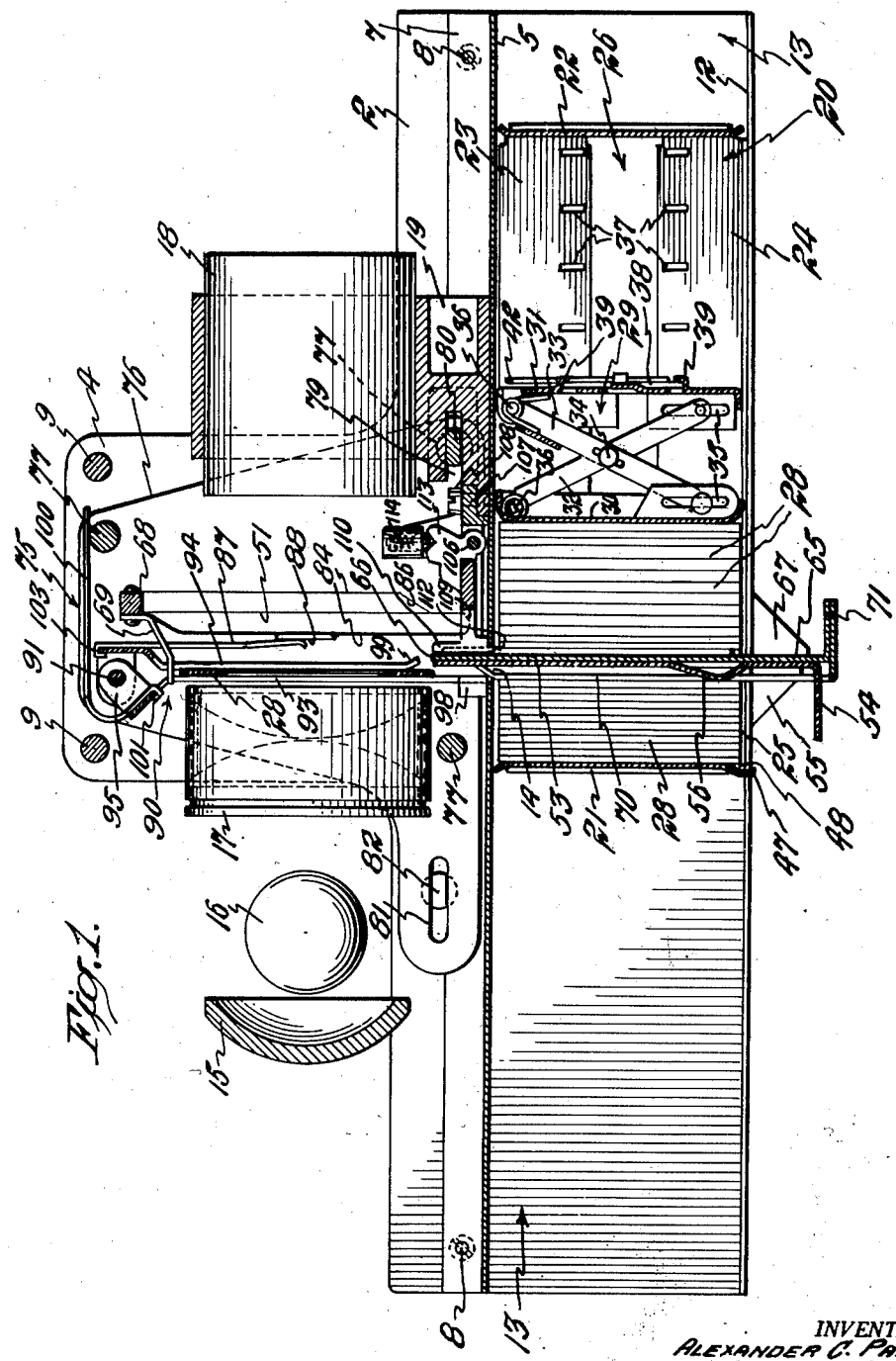
Fig. 1 is a longitudinal vertical sectional view through a viewer embodying the invention and adapted for projecting the pictures on a screen.

In the following description certain specific terms are used for convenience in referring to the various details of the invention. These terms, however, are to be interpreted as broadly as the state of the art will permit.

The various parts of the viewer will be described below under separate headings, followed by a description of the operation of the instrument.

*Outer casing*

The outer casing of the viewer is best shown in Figs. 1, 10 and 11, and comprises a pair of elongated parallel side walls 1 and 2 having central upper portions or extensions 3 and 4.

A flat horizontal shelf 5 extends lengthwise through the casing and has side flanges 6 and 7 which are secured to the side walls 1 and 2 of the casing by screws or rivets 8 (Fig. 11) which thus hold the casing together. The upper portions 3 and 4 of side walls 1 and 2 are secured in proper spaced relation by posts 9.

The lower longitudinal edges of side walls 1 and 2 are turned inwardly at right angles, as illustrated at 10 and 12, thus forming bottom ledges which are parallel to the shelf 5. It will thus be seen that the entire lower portion of the casing constitutes an elongated open-ended chamber 13 having parallel side walls 1 and 2, a top wall 5, and bottom ledges 10 and 12. This chamber 13 will be referred to as the "magazine chamber" because it receives the picture magazine, as hereinafter described.

The shelf 5, which constitutes the top wall of magazine chamber 13, contains a transverse opening 14 about midway between the ends of the shelf, as shown in Figs. 1, 2, 5 and 6. It is through this opening 14 that pictures are conveyed from magazine chamber 13 to the viewing position above shelf 5, and then returned to the magazine in chamber 13 after having been viewed.

The viewer shown herein for purposes of illustration is adapted to project the pictures on a screen, and for this purpose any suitable projecting apparatus may be employed. In the embodiment illustrated, the projecting apparatus comprises a reflector 15, lamp 16, condensing lens 17 and projecting lens 18 suitably mounted on the shelf 5 of the casing, the lens 18 being adjustably mounted in a support 19 on said shelf. When in use, the viewer may be mounted on a tripod or other suitable support.

*Picture magazine*

The picture magazine 20, best shown in Figs. 1, 9 and 10, comprises a skeleton box-like structure having end walls 21 and 22 connected on each side by upper and lower parallel ribs 23 and 24. The bottom longitudinal edges of the lower ribs 24 are flanged inwardly at right angles to provide narrow bottom ledges 25 which support the pictures when the latter are inserted in the magazine as hereinafter described. The upper longitudinal edges of ribs 24, and both the upper and lower longitudinal edges of ribs 23, are flanged outwardly as shown in Fig. 10, so that each side of the magazine contains an elongated slot or opening 26 extending the full length of the magazine between the upper and lower ribs 23 and 24. Since the top of the magazine is completely open, it will be evident that rectangular pictures, of a size commensurate with the interior width and height of the magazine, may be inserted through the open top of the magazine and seated on the longitudinal bottom ledges 25 of ribs 24. Fig. 9 shows a group of pictures 28 stacked in the magazine, and, since it is clear from Fig. 10 that the bottom of the magazine is also open except for the narrow longitudinal ledges 25, it will be evident that force may be exerted through the open bottom of the magazine to elevate the pictures 28 through the open top of the magazine.

Again referring to the picture magazine shown in Figs. 1, 9 and 10, we shall now describe the adjusting device 29 which enables the magazine to accommodate any desired number of pictures. This unitary device comprises a picture contact plate 30 and an adjusting plate 31 which are connected together by two pairs of spring actuated cross-arms or "lazy tongs" 32 and 33, as best shown in Fig. 1. The arms 32 and 33 of each pair are swivelled together by a slot and pin connection 34, and one extremity of each arm slides in a slotted flange 35 on plate 30 or 31, while the opposite extremity is hinged to the other plate by a pintle 36 carrying a spring which acts on the arms 32 and 33 in a direction to force the plates 30 and 31 apart. Thus, assuming the adjusting plate 31 to be held in fixed position in the magazine in a manner presently to be described, the spring-actuated contact plate 30 will exert a uniform yielding pressure on the stack of pictures 28, maintaining said pictures in upright position and urging them toward the end wall 21 of the magazine as shown in Fig. 9.

The upper and lower ribs 23 and 24, which constitute the sides of the picture magazine 20, each contain a plurality of equally spaced slots 37 which are arranged in vertical alignment adjacent the longitudinal opening 26 on each side of the box-like structure. The outer face of adjusting plate 31 of the picture magazine carries a pair of spring-actuated plates 38 which are slidably mounted in guides 39 on plate 31 and have reduced central portions or finger pieces 40 which project into the longitudinal openings 26 at the sides of the magazine in position to be depressed by the fingers of the operator, somewhat like push buttons. The outer edges of plates 38 also have small detents 42 which are adapted to engage in the slots 37 in the side ribs 23 and 24 of the picture magazine. A bowed spring 43 is sprung between lugs 44 on the respective plates 38 and acts to force said plates outwardly to engage the detents 42 in the slots 37, as illustrated in Fig. 10. However, when the finger pieces 40 are pressed inwardly, until plates 38 strike a stop lug 45 on adjusting plate 31, detents 42 will be withdrawn from slots 37 and the unitary adjusting device comprising picture contact plate 30 and adjusting plate 31 may be moved freely back or forth in the magazine to accommodate any desired number of pictures 28.

In Fig. 9 the magazine is about half full of pictures. One or two additional pictures, if not too thick, may be inserted in the magazine without shifting the adjusting device 29 since contact plate 30 will yield sufficiently to accommodate same. If it is desired to insert a substantial number of additional pictures into the magazine, the finger pieces 40 of adjusting plate 31 are depressed as previously described and the operator then slides the adjusting device 29 toward the right in Figs. 1 and 9, to a distance sufficient to accommodate the added pictures, whereupon the finger pieces 40 are released and the detents 42 are engaged in the adjacent slots 37 in the side ribs 23 and 24 of the magazine. When it is desired to decrease the number of pictures in the magazine, of course, the adjusting device is shifted in the opposite direction, that is, toward the left as viewed in Figs. 1 and 9. It will be evident that a magazine such as that shown in Fig. 9 may contain a permanent file of pictures relating to a common subject, and may be maintained intact for use in the lecture room or for other exhibition purposes; and it will be understood that any number of loaded magazines may be provided for use in a single viewing instrument.

The picture magazine shown in Fig. 9 is always inserted in the left-hand end of the open-ended magazine chamber 13 of the instrument as viewed in Figs. 1 and 11, and it is always removed from this same left-hand end of the instrument at the conclusion of the viewing operation or exhibition. When so removed, the pictures are nested in the magazine in precisely the same position and sequence as they occupied before the viewing operation. We shall shortly describe the method of inserting the magazine in the chamber 13, and the mechanisms for shifting the pictures to and from the viewing position. First, however, we call particular attention to the fact that the end wall 21 of the picture magazine has its lower edge offset or bent outwardly and extended downwardly a short distance below the bottom of the magazine to form a flange or stop member 47, as shown in Figs. 1, 2, 5, 6 and 9. At this point we merely wish to mention that this stop 47 limits the inward movement of the magazine when it is inserted into the chamber 13 and thus positions the magazine properly in said chamber; and, furthermore, this offset extension or stop 47 creates an interior space 48 beneath the vertical plane of the end wall 21 of the magazine, which space 48 will remain vacant when a picture 28 rests flat against said end wall 21 as best shown in Fig. 5. This space 48 facilitates the entry of the divider plate between the end wall 21 and the adjacent picture, as will now be described.

*Divider plate and picture slide*

As previously explained, the side walls 1 and 2 of the viewer casing have central upwardly extending portions 3 and 4. These extensions 3 and 4 each contain a pair of spaced parallel vertical slots 50 and 51, as best shown in Fig. 11. The two slots 50 are aligned with each other and serve as guides for the up and down movement of the divider plate; while the two slots 51 are aligned with each other and serve as guides for the up and down movement of the reciprocable picture slide.

The divider plate 52, shown in Fig. 15, comprises a flat plate portion 53 having a handle or finger piece 54 on its lower edge, and a pair of elongated upwardly extending parallel side arms 55. The divider plate may comprise a single metal stamping with the flat arms 55 bent at right angles to the flat plate portion 53, and a central cam or ridge 56 is stamped up on one face of plate 53 adjacent the lower edge thereof.

The arms 55 of the divider plate 52 straddle the outer side walls 1 and 2 of the viewer casing, one of said arms 55 lying flat against the wall 1, and the other arm 55 lying flat against the wall 2. The upper inner ends of the arms 55 carry studs 57 which slide in the vertical slots 50 in the upwardly extending portions 3 and 4 of the casing walls 1 and 2, thus guiding the vertical up and down movement of the divider plate 52. In order to maintain the divider plate 52 in upright position, a small lug 58 is stamped up in the lower surface of each side wall 1 and 2 of the viewer casing to contact the outer vertical edge of the arms 55 of the divider plate and thus prevent same from canting toward the left in Fig. 11. The divider plate is prevented from canting toward the right in Fig. 11 by its sliding engagement with the picture slide, as hereinafter described.

When the divider plate 52 is at the lower limit of its vertical travel, as shown in Fig. 6, the flat plate portion 53 thereof is retracted to a point where it lies below the picture magazine 20. If the magazine chamber 13 be empty at such time, and it is desired to insert the loaded magazine 20 of Fig. 9 into said chamber 13, such magazine may be inserted into the left-hand end of chamber 13 as viewed in Figs. 1, 6 and 11. The magazine may then be pushed forward in said chamber 13 until the offset stop 47 on the lower end wall 21 of the magazine strikes against the upper edge of flat plate portion 53 of divider plate 52 as shown in Fig. 6, thus limiting the inward movement of the magazine into the magazine chamber 13 and bringing same to the proper position for elevating the divider plate 52 preparatory to the actual viewing operation. When the divider plate is thus elevated to the upper limit of its travel, it is maintained in such elevated position against accidental displacement by a leaf spring 60 on said wall 1 of the viewer having a ball-shaped detent 61 which engages in a mating hole 62 in the adjacent arm 55 of the divider plate.

The reciprocable picture slide 64, shown in Figs. 13 and 14, comprises the following parts united in a single structure: a flat plate 65 having an upper edge 66 for engaging and propelling the pictures upwardly into the viewing position; elongated flat side arms 67 flanged at right angles to said plate 65; a cross-bar 68 joining the upper ends of the side arms 67 and carrying depending fingers 69 for engaging and propelling the pictures downwardly from the viewing position back into the picture magazine; a bifurcated plate comprising a pair of spring arms or prongs 70 welded to one face of plate 65 and spaced therefrom sufficiently to admit the flat portion 53 of divider plate 52 between said prongs 70 and said plate 65; a handle or finger piece 71 formed by bending over the united lower ends of the plate 65 and the bifurcated plate; and spaced parallel ridges or cams 72 formed on the face of plate 65 opposite to that containing the prongs 70.

When the parts are assembled in the manner shown in Fig. 11, the cross-bar 68 of the picture slide 64 rides in the vertical slots 51 which are formed in the upper extensions 3 and 4 of side walls 1 and 2 of the viewer casing. The flat side arms 67 of the picture slide lie flat against the side walls 1 and 2 of the casing; one vertical edge of each side arm 67 abuts against the vertical edge of the adjacent side arm 55 of divider plate 52; and the other vertical edge of each side arm 67 abuts against a guide lug 74 which is struck up in each of the side walls 1 and 2 of the casing adjacent the lower edge thereof, as shown in Fig. 11. The flat plate portion 53 of divider plate 52 is nested between the prongs 70 of picture slide 64 and the flat plate 65 of said slide, as illustrated in Figs. 2, 3, 5 and 6.

It will thus be evident that the divider plate 52 and the picture slide 64 may be moved vertically up and down independently of each other. Fig. 6 shows both the divider plate 52 and the picture slide 64 at the lower limit of their travel, which is the position they occupy when a loaded picture magazine 20 is about to be inserted into magazine chamber 13. When such magazine is inserted into chamber 13 from the left-hand end of the chamber as viewed in Figs. 1 and 6, the offset stop 47 on end wall 21 of the magazine strikes against the upper edge of the flat plate 53 of divider plate 52, as shown in Fig. 6. Thereupon, the operator grasps the handle 54 of the divider plate 52 and moves same upwardly to the limit of its travel, which is the position shown in Fig. 11.

At the start of such upward movement of divider plate 52, the upper edge of its flat plate portion 53 will enter the vacant space 48 which exists between the bottom of end walls 21 of the magazine and the first picture 28 adjacent said end wall, as shown in Fig. 6. In this way the divider plate is prevented from striking the bottom edge of the nearest picture, and, instead, said plate continues upwardly between said picture and the end wall 21 of the magazine with a camming action which forces the entire picture magazine slightly to the left in chamber 13, as indicated by the dotted lines in Fig. 6. When the divider plate 52 reaches the upper limit of its travel, it will be locked in such position by the leaf spring 60, as shown in Fig. 11. When in such position, the upper edge of flat plate portion 53 of the divider plate will project upwardly a short distance through the opening 14 in the shelf 5 of the casing (which is also the roof of magazine chamber 13). Figs. 2 and 3 show the divider plate in this position, and it remains locked in this position throughout the viewing operation until such time as it is desired to remove the picture magazine from the magazine chamber 13.

With the parts in the position shown in Figs. 2 and 3, the picture 28 which contacts the flat plate portion 53 of divider plate 52 (on the right side of plate portion 53 in Fig. 2) lies directly above the upper edge 66 of picture slide 64, being held in that position by the pressure exerted by the spring actuated cross-arms 32 and 33 of the picture magazine. Accordingly, when the operator grasps the handle 71 of picture slide 64 and moves said slide upwardly, the upper edge 66 of slide 64 lifts the aforesaid picture 28 upwardly through the opening 14 in the shelf 5 of the casing as illustrated in Fig. 5. Furthermore, during the ascent of the slide 64 the ridges or cams 72 on the flat plate 65 of the slide exert a camming or wedging action on the next picture 28 (the one next to the picture which is being elevated) and thereby relieve the pressure of the stacked pictures and cam them away from the rising picture and prevent the latter from jamming, this wedging action also being illustrated in Fig. 5.

*Picture exhibiting carriage*

We shall now describe the longitudinally shiftable picture exhibiting carriage 75 which is mounted on top of the shelf 5 of the casing and receives the pictures 28 as they are elevated through the opening 14 in said shelf.

The carriage 75 comprises two identical side plates 76 which are secured together in spaced parallel relation by three posts 77 (Figs. 1, 2, 5, 7 and 8) secured in holes 78 (Fig. 4) in said side plates.

The following is the manner in which the carriage 75 is mounted to move slightly in a longitudinal direction on the casing. The support 19 carrying projecting lens 18 has a horizontal slot 79 as shown in Figs. 1, 2 and 5. The lower right post 77 of carriage 75 (as viewed in Figs. 1, 2 and 5) has a central flattened portion 80 (see also Fig. 8) which is mounted to slide longitudinally in the slot 79 in support 19. Furthermore, the lower left ends of carriage side plate 76 (as viewed in Figs. 1, 2 and 5) contain elongated horizontal slots 81 which track on studs 82 secured to the side walls 1 and 2 of the casing (see also Figs. 7 and 8). Thus the carriage 75 may be shifted slightly toward the left or right in Fig. 1.

The two side plates 76 of carriage 75 contain irregularly shaped vertical slots 84 having an upper cam surface 85 and a lower cam surface 86, as shown in Figs. 1, 4 and 5. The over-all width of the slot 84 is approximately twice the width of the vertical slots 51 in the upper portions 3 and 4 of the casing which, as previously explained, constitute tracks or guides for the cross-bar 68 of the reciprocable picture slide 64. This cross-bar 68 likewise extends through the vertical slots 84 of the carriage 75, and it is the up and down movement of the cross-bar 68 in slots 84 which causes the carriage 75 to shift toward the left or right as viewed in Figs. 1, 2 and 5.

In order to demonstrate this shifting movement of carriage 75, attention is called to Fig. 2 in which the reciprocable picture slide 64 is at the lower limit of its travel. At such time the cross-bar 68 of slide 64 is at the bottom of vertical slots 51 in the casing (see also Fig. 11) and hence it is also at the bottom of vertical slots 84 of carriage 75. Now, as the slide 64 is pushed upwardly to elevate a picture 28 into viewing position, the cross-bar 68 of slide 64 travels upwardly in slots 51 of the casing as well as in slots 84 of the carriage. Fig. 5 shows the slide 64 about half way up in its travel. A pair of spring fingers 87, mounted on the carriage in a manner and for a purpose hereinafter described, press against shoulders 88 on the sides 76 of the carriage as shown in Figs. 1, 2 and 5. The sides 76 of the carriage also contain suitable slots or holes 83 and 89, the purpose of which will be described presently.

When the ascending cross-bar 68 of slide 64 strikes the upper cam surfaces 85 in the side plates 76 of carriage 75 (just before slide 64 reaches the upper limit of its travel) the camming action causes the carriage 75 to move as a unit toward the left as viewed in Fig. 1, and slide 64 comes to rest with its cross-bar 68 at the top of slots 84 in side plates 76 of the carriage, as well as at the top of slots 51 in the casing, as shown in Fig. 1. At this time the carriage 75 is as far to the left (Fig. 1) as it can travel. When the slide 64 again descends, the carriage 75 will remain in the position shown in Fig. 1 until cross-bar 68 strikes the lower cam surfaces 86 in the side plates 76 of carriage 75 (just before slide 64 reaches the lower limit of its travel) at which time the camming action causes the carriage 75 to move as a unit toward the right as viewed in Figs. 1 and 2, and the slide 64 comes to rest with its cross-bar 68 at the bottom of slots 84 in side plates 76 of the carriage, as well as at the bottom of slots 51 in the casing, as shown in Fig. 2. At this time the carriage is as far to the right (Fig. 2) as it can travel.

The reason for thus shifting the carriage 75 longitudinally of the instrument is to properly position each ascending picture in the viewing frame 90 (which is about to be described) and to insure that each descending picture will be in the proper vertical plane to be returned to the picture magazine after the picture has been viewed.

The viewing frame 90 on carriage 75 is shaped like an inverted U and is mounted on a rod 91 which extends between the side plates 76 of carriage 75 (Figs. 1, 2, 3, 5 and 7) and is secured in holes 92 (Fig. 4) in said side plates 76. The said viewing frame 90 comprises two inverted U-shaped members 93 and 94 which are mounted face to face so as to clamp the marginal edges of a picture between them while leaving the picture itself exposed to view between the legs of the U-shaped frame. The inverted U-shaped member 93 has a pair of integral ears 95 which are journaled on the rod 91 of carriage 75, while the inverted U-shaped member 94 has a pair of integral ears 96 having slightly elongated holes 97 (Figs. 2 and 5) journaled on said rod 91. The lower free ends of U-shaped member 93 extend slightly into the opening 14 in the shelf 5 of the viewer casing and have small integral tabs 98 bent at right-angles to the legs of the U, as shown in Figs. 1, 2, 5 and 8. The other U-shaped member 94 has somewhat shorter legs which terminate above the top of shelf 5 of the viewer casing, and the lower ends of said legs are turned outwardly at 99 (Figs. 1, 2 and 5) to facilitate the entry of an ascending picture between the legs of the U-shaped member 93 and the legs of the U-shaped member 94. Each leg of U-shaped member 94 has a projecting ear 94' which engages in the adjacent slot 83 in the sides 76 of carriage 75 to limit the movement of member 94, while each leg of U-shaped member 93 has a projecting ear 93' which engages in the adjacent slot 89 in the sides 76 of carriage 75 to limit the movement of said member 93, all as shown in Fig. 3.

A pair of leaf springs 100 each have one end bent over and clamped at 101 in the top of U-shaped member 93, and the other free end flexed against the upper post 77 which joins the side plates 76 of carriage 75. These springs 100 are flexed to urge the U-shaped member 93 yieldingly toward its companion U-shaped member 94. The spring fingers 87, previously referred to as bearing on the shoulders 88 on side plates 76 of carriage 75, are secured at 103 to the top of U-shaped member 94, and the pressure of these spring fingers urges the U-shaped member 94 yieldingly against its companion U-shaped member 93.

We have already explained, with reference to Figs. 2 and 5, how a picture 28 begins its ascent from the picture magazine into the viewing position. Fig. 2 shows the reciprocable picture slide 64 in the "down" position with its upper edge 66 directly beneath and aligned with one of the pictures 28 in the magazine, to wit, the picture which is flat against the right-hand side of the flat plate portion 53 of the divider plate. Inasmuch as the slide 64 is down, its cross-bar 68 is necessarily down at the bottom of the vertical slots 84 in side plates 76 of carriage 75, as a result of which the carriage 75 is shifted to the right as viewed in Fig. 2. With the parts in this position, the inverted U-shaped viewing frame 90 is in the position shown in Fig. 2, ready to receive the picture which is elevated by the slide 64.

As the slide 64 ascends, it pushes the superposed picture 28 through the opening 14 in the shelf 5 of the casing, and the ascending picture enters between the legs of the U-shaped member 93 and the legs of the U-shaped member 94, being guided by the turned-out ends 99 of said member 94. Fig. 5 shows said picture 28 partway up. The pictures are customarily framed in cardboard or plastic mounts, and the flexible legs of the inverted U-shaped viewing frame grip only the marginal faces of said mounts, the legs of U-shaped member 93 engaging one face of the mount while the legs of U-shaped member 94 engage the other face of the mount. The picture continues to ascend in this manner until it is fully seated in the viewing frame 90, and then, as the slide 64 continues its ascent, its cross-bar 68 strikes the upper cam surfaces 85 of carriage 75 thereby shifting the carriage 75 bodily toward the left in Fig. 5 until it comes to rest in the position shown in Fig. 1 with the cross-bar 68 of the slide at the top of the slots 84 of the carriage.

The elevated picture is now in viewing position, where it remains until such time as the operator desires to return it to the picture magazine. With the parts in this viewing position (Fig. 1) it will be noted that the elevated picture 28 and the viewing frame 90, in which said picture is seated, no longer overlie the upper "pushing" edge 66 of the slide 64. Instead, said picture 28 and viewing frame 90 occupy a position slightly to the left of the flat portion 53 of divider plate 52. Furthermore, the fingers 69 on the cross-bar 68 of picture slide 64 overlie the top edge of the picture 28 in viewing frame 90, and are thus in position to descend upon said picture and push it down when the slide 64 is lowered. Accordingly, when the operator lowers the slide 64 the fingers 69 force said picture down through the viewing frame 90 and through that portion of the opening 14 in shelf 5 which is on the left-hand side of the flat plate portion 53 of the divider plate (Fig. 1). As the picture descends into the magazine the descending arms or prongs 70 of slide 64 preserve a space between the flat plate portion 53 of the divider plate and the last previously-stacked picture 28 on the left side of said plate as seen in Fig. 1, and the descending picture readily enters such space. As such descending picture nears the bottom of the magazine it rides over the cam or ridge 56 on plate 53 and exerts force on the previously stacked pictures which causes the entire picture magazine to move toward the left in magazine chamber 13 by a distance equal to the width of the newly stacked picture. The cross-bar 68 of picture slide 64 strikes against the lower cam surfaces 86 of carriage 75, thereby shifting the carriage to the right in Fig. 1. At this point the parts are again in the position shown in Fig. 2, ready to start another picture on its way to the viewing position.

*Adjustment for pictures of different thicknesses*

As previously explained, the pictures 28 are customarily framed in cardboard or plastic mounts which may vary considerably in thickness, especially when produced by different manufacturers. In Figs. 1, 2 and 5, for example, it will be noted that some of the pictures are almost twice as thick as others.

The transverse opening 14 in shelf 5 of the casing (which is the roof of magazine chamber 13) is large enough to pass even the thickest picture 28. However, in the absence of means to regulate the size of opening 14, a very thin picture might conceivably "wobble" during its ascent through said opening and perhaps fail to enter the jaws of the inverted U-shaped viewing frame 90 with the smoothness necessary to the perfect functioning of the instrument. Furthermore, in the absence of preventive means, it might be possible for the ascending picture to catch or adhere to the adjacent picture and carry said adjacent picture up through the opening 14.

Such accidental displacement of ascending pictures, and such accidental elevation of two lightly-adhering pictures, are prevented by the adjusting device or "adapter" shown in Figs. 1, 2, 5 and 8. This device comprises a frame 105 pivoted on a rod 106 carried by a bracket 107 which is secured by screws 108 to the support 19 on shelf 5 of the casing. The adapter frame 105 has two identical side arms 109 shaped somewhat like a tack-hammer with flat-faced heads 110 having depending lips 112, as best shown in Fig. 5. When the adapter frame 105 is raised on its pivot 106 as shown in Fig. 5 the heads 110 of side arms 109 are elevated above the opening 14 in shelf 5 of the casing. However, when frame 105 is lowered as shown in Fig. 1, the lips 112 enter the opening 14 in shelf 5 and effectively reduce its width while the flat faces of heads 110 form vertical guides for any relatively thin picture 28 which may rise through such reduced opening 14.

When the reciprocable picture slide 64 is in the "down" position shown in Fig. 2 (ready to start elevating a picture through opening 14 in shelf 5) the adapter frame 105 is also in the "down" position (as hereinafter more fully explained) and therefore the opening 14 is reduced or "adapted" to pass only the thinner pictures 28, and such a picture will freely ascend without dislodging the adapter frame. However, when one of the thick pictures ascends through opening 14 the top edge of such picture strikes the lips 112 of adapter heads 110, and the adapter frame 105 is moved upwardly on its pivot 106 to the position shown in Fig. 5. The frame 105 carries a cam 113 cooperating with a spring-pressed detent 114 on bracket 107, which locks the frame 105 in the elevated position shown in Fig. 5. However, when the reciprocable picture slide 64 descends and its cross-bar 68 rides over the lower cam surfaces 86 in slots 84 of the shiftable carriage 75, said cross-bar 68 also strikes the side arms 109 of adapter frame 105 and thereby lowers said frame 105 which is then yieldingly held in such lowered position by the action of the spring-pressed detent 114 on cam 113 as shown in Fig. 1.

Thus each picture 28, regardless of its thickness, ascends through the opening 14 in shelf 5 in the proper vertical plane to enter the jaws of the inverted U-shaped viewing frame 90, into which it is guided by the turned ends 99 of the U-shaped member 94. Furthermore, due to the resiliency of the U-shaped members 93 and 94 of said viewing frame, and the elongated slot 97 in the pivot of U-shaped member 94, the viewing frame is automatically adjusted to accommodate any picture. At the conclusion of the viewing, of course, each picture is returned to the magazine in the manner previously described.

*Operation—Figs. 1 to 15*

The operation of the instrument shown in Figs. 1 to 15 has been largely explained in the foregoing description of which the following is a summary.

The pictures to be exhibited are stacked in the magazine 20 in the order in which they are to be displayed, beginning with the first picture which is placed at the extreme left of the magazine as viewed in Fig. 9. In thus stacking the pictures in the magazine, the adjusting device 29 is adjusted with reference to the slots 37 to hold the pictures snugly in place. The pressure which we employ is preferably such that the pictures will remain stacked in the magazine even if the latter should happen to be turned upside-down.

The loaded magazine 20 of Fig. 9 is inserted into the left-hand end of magazine chamber 13 (Fig. 1) until the stop member 47 on end wall 21 of the magazine strikes the upper edge of flat plate portion 53 of divider plate 52 as shown in Fig. 6. The parts are now in the proper position for elevating the divider plate 52 preparatory to the viewing of the first picture.

The operator now grasps handle 54 of divider plate 52 and raises the latter to the position shown in Figs. 2 and 11. The divider plate thus partitions chamber 13 and magazine 20 into a supply compartment on the right of the divider plate, and a storage compartment on the left of the divider plate, as seen in Figs. 1, 2 and 5. Throughout the entire viewing operation the divider plate 52 remains locked in this elevated position by the leaf spring 60 and cooperating detent 61, as shown in Fig. 11.

The operator now grasps the handle 71 of reciprocable picture slide 64 and lifts the latter to the upper limit of its travel. In so doing, the first picture in the stack, lying directly above the upper edge 66 of flat plate portion 65 of the picture slide is elevated through the opening 14 in shelf 5, and raised into viewing position between the U-shaped members 93 and 94 of the viewing frame 90. If the ascending picture happens to be one of the thick pictures, its advancing top edge will elevate the adapter frame 105 (Fig. 5) and thus clear the opening 14 in shelf 5 for the passage of such picture. As the slide 64 nears the upper limit of its travel, the crossbar 68 of said slide will strike the upper cam surfaces 85 in the side plates 76 of carriage 75, thus moving carriage 75 as a unit toward the left in Fig. 5, and moving frame 90 to the position shown in Fig. 1 as soon as the bottom edge of the picture clears the top edge of the divider plate. The picture is now in the viewing position, and it remains in such position as long as the operator desires to exhibit the picture on the projecting screen.

When it is desired to return the picture to the magazine 20, the operator again grasps handle 71 of slide 64 and lowers the slide to the original position shown in Fig. 11. In so doing, the picture descends in the plane which it occupies in Fig. 1, and it passes through opening 14 in shelf 5 into the magazine 20 where it occupies the position immediately adjacent the left-hand face of flat plate 53 of divider plate 52 as seen in Fig. 1. The descending cross-bar 68 of slide 64, near the bottom of its travel, strikes the lower cam surfaces 86 in the side plates 76 of carriage 75, thereby shifting carriage 75 toward the right until it occupies its original starting position shown in Fig. 2. The descending cross-bar 68 of slide 64 also strikes the side arms 109 of adapter frame 105, if same were previously elevated to the position shown in Fig. 5, and returns same to the original "down" position shown in Fig. 2.

Each succeeding picture 28 in the stack at the right side of the divider plate in Fig. 2 may be exhibited in the manner just described, and then returned to the magazine 20 to join the other previously-exhibited pictures at the left of the divider plate in Fig. 2. If the operator should decide to discontinue the exhibition before all of the pictures have been displayed, he simply lowers slide 64 and divider plate 52 to the position shown in Fig. 6, at which time the entire file of pictures will be found stacked in their original positions in magazine 20. The same condition, of course, will prevail when the exhibition is not concluded until all of the pictures have been exhibited. In other words, the pictures 28 will not change their original positions in magazine 20 unless they are intentionally shifted by hand after the magazine has been removed from the instrument.

After the conclusion of the viewing operation, as described above, with slide 64 and divider plate 52 in the retracted position shown in Fig. 6, the operator simply reaches into the right-hand end of magazine chamber 13 as viewed in Figs. 1, 2, 5 and 6, and pushes the magazine 20 out through the left-hand end of chamber 13, and removes the magazine from the instrument; or he may reach into the left-hand end of chamber 13 and pull the magazine out of the chamber. The magazine may now be stored for future use, and other picture magazines may be substituted therefor in the instrument, as desired. Various files of previously-arranged picture magazines may be prepared in advance and stored for use as required for exhibition purposes, lectures and the like.

*Modification—Figs. 16 to 20*

Figs. 16 to 20 are diagrammatic views illustrating a modification of the invention in which the picture exhibiting carriage, instead of being bodily shiftable in a longitudinal direction as previously described, is pivoted to the top of the instrument and is adapted to move or swing on its pivot to receive the pictures from the magazine and return them thereto after viewing.

The instrument shown in Figs. 16 to 20 also differs from that previously described in that the picture magazine consists merely of a boxlike chamber 116 provided with suitable end covers (not shown) having spring-actuated plates 117 and 118, respectively, which fit inside the chamber 116 when the covers are closed. The bottom wall 119 of the magazine has a transverse opening 120, while the top wall 121 has a transverse opening 122.

The flat-faced divider plate or partition 124 extends upwardly through the opening 120 in bottom wall 119 and slides vertically in suitable guides or grooves (not shown) in the side walls of the magazine. This divider plate, which is shown in elevated position in the magazine in all of Figs. 16 to 20, has a pair of spaced cams or ridges 125 on the right or "storage" side of the magazine to facilitate stacking of the descending pictures, as hereinafter more fully described. When the divider plate is in its elevated position, as it is during the entire viewing operation, its upper horizontal edge lies just below the transverse opening 122 in the top wall 121 of the magazine. The divider plate 124 thus divides the magazine chamber 116 into a supply compartment on the left of the divider plate, and a storage compartment on the right of the divider plate. Hence the picture 28 immediately on the left of the divider plate may ascend through opening 122 in the top wall 121 of the magazine into the viewing position; and, after having been viewed, a descending picture may pass through said opening 122 and be stacked immediately to the right of the divider plate.

The flat-faced reciprocable picture slide 126 is adapted to move up and down through the opening 120 in bottom wall 119 and has upwardly extending side arms or flanges 127 similar to the side arms 55 of the divider plate of Figs. 1 to 15. The slide 126 has a lower finger grip 128, and it has pairs of spaced ridges or cams 129 and 130 on its left and right faces, respectively. A cross-bar 132 joins the upper ends of the side arms 127 of the divider plate and has a ledge 133 for engaging and propelling the pictures downwardly from the viewing position, as hereinafter described. When the slide 126 is at the lower limit of its travel (Fig. 16) the upper edge 134 of its flat-faced portion coincides with the bottom wall 119 of the magazine and lies directly beneath the picture which abuts against the left face of divider plate 124, so that said edge 134 will engage and propel said picture upwardly into the viewing position when the slide 126 is raised.

The picture exhibiting carriage 135 comprises an inverted U-shaped frame which may be a single metal stamping having two inverted U-shaped sides 136 and 137 having their common upper bar 138 pivoted at 139 to the top wall 140 of the instrument so that the entire carriage 135 may be swung as a unit between left and right as seen in Figs. 16 to 20. The sides 136 and 137 of carriage 135 are flexed toward each other and have bent-in portions 141 adjacent the bottom, while the central portions of their bottom ends are bent at right-angles to form extensions 142 and 143, respectively, which lie in cut-out portions of the top wall 121 of the magazine. A spring 145 engages the bottom extension 142 of the inverted U-shaped side 136 of carriage 135 and is flexed to swing said carriage 135 upon its pivot 139 toward the right as seen in Figs. 16 to 20. Such movement toward the right is limited by a stop 146 on top wall 121 when engaged by a similar stop 147 on extension 143, as shown in Fig. 18.

Assuming that the viewer of Figs. 16 to 20 is empty, the left-hand cover and pressure plate 117 are removed as a unit, and the divider plate 124 is raised while the picture slide 126 is pulled down to the lower limit of its travel. A stack of pictures is now inserted into chamber 116 through the left-hand open end thereof. The divider plate remains elevated throughout the viewing operation. The left-hand cover is now secured in place with its pressure plate 117 seated in chamber 116 against the stack of pictures. The entire stack of pictures 28 is now seated in the supply compartment on the left of divider plate 124, while the storage compartment on the right of the divider plate is empty. The pressure plate 117 forces the stack of pictures in the supply compartment toward the right, so that the first picture in the stack lies flat against the divider plate directly above the edge 134 of slide 126.

The operator now grasps the finger grip 128 of slide 126 and raises the slide 126. The ascending slide 126 pushes the aforesaid first picture up through the opening 122 in the top wall 121 of magazine chamber 116, and into the jaws of the inverted U-shaped sides 136 and 137 of exhibiting carriage 135. As the slide ascends, its cams or ridges 129 and 130 ride up as shown in Fig. 18, the ridges 129 camming the supply stack of pictures away from the ascending picture. The picture ascends toward the top of the inverted U-shaped frame, and, as the slide 126 ascends, the spring 145 tips the entire frame and picture about the pivot 139 in a counter-clockwise direction as seen in Fig. 16. The picture is now in the viewing position shown in Fig. 18, where it may be viewed through a suitable eyepiece, or by projection on a screen. In this position (Fig. 18) it will be noted that the lower open end of carriage 135, or jaws of the inverted U-shaped frame, are above the portion of opening 122 which lies to the right of divider plate 124.

After the picture has been viewed, the operator lowers the slide 126, the ledge 133 of cross-bar 132 engaging the upper edge of the picture and propelling the picture downwardly through the opening 122 into the storage compartment of magazine chamber 116 on the right-hand side of divider plate 124. As the slide 126 descends, its ridges or cams 130 slide along the face of pressure plate 118 if the storage compartment is empty (or along the sides of the last previously-stored picture if there are one or more pictures in the storage compartment) and thus create a space to receive the descending picture. As the slide 126 nears the bottom of its travel, its cross-bar 132 strikes the left-hand bent portion 141 of carriage 135 and pivots the entire carriage in a clockwise direction against the pressure of spring 145, thus returning the carriage to the position shown in Fig. 16. The operator continues the viewing operation as previously described until each picture, in turn, is presented to the viewing position and then returned to the storage compartment. When all the pictures have been viewed and lowered, they will all rest in a stack in the storage compartment, in the same order which they originally occupied in the supply compartment of chamber 116.

As the conclusion of the viewing operation the divider plate 124 and the slide 126 are both lowered clear of the chamber 116, and the pictures may be removed from either end of chamber 116 by removing one or the other end cover, or else the entire stack of pictures may be returned to the supply compartment for re-exhibiting. In one of our small-model viewers the right-hand cover of chamber 116 is permanently closed, and, after the divider plate 124 and slide 126 are lowered at the conclusion of the viewing operation, the operator simply reaches his finger into a hole in said right-hand cover and pushes the pressure plate 118 toward the left in Figs. 16 to 20. This forces the entire stack of pictures into the supply compartment on the left of divider plate 124, whereupon the operator raises the divider plate, and the pictures are ready to be re-exhibited in their original order. In this instrument, even the removable left-hand cover need never be removed except when it is desired to replace or rearrange the pictures in the magazine chamber.

Although certain specific embodiments have been shown and described herein for purposes of illustration, it will be evident to those skilled in the art that the invention is capable of various modifications and adaptations within the scope of the appended claims.

The invention claimed is:

1. A picture viewer comprising a chamber adapted to contain a plurality of pictures, means in said chamber dividing the latter into a picture supply space and a picture storage space, a movable picture frame in a viewing position adjacent said supply and storage spaces, a movable slide for conveying pictures individually between said frame and said chamber, and means responsive to the movement of said slide for moving said frame between points communicating respectively with said supply and storage spaces to receive and discharge pictures.

2. A picture viewer comprising a chamber having an opening and adapted to contain a plurality of pictures, a divider plate in said chamber in the plane of said opening and dividing said chamber into a picture supply space and a picture storage space, a reciprocable picture slide in said supply space adjacent said divider plate, a movable picture frame mounted in a viewing position outside said opening, means responsive to the reciprocating movement of said slide to move said frame alternately to different sides of said divider plate, and means on said slide for moving pictures into and out of said frame and said opening.

3. A picture viewer comprising a chamber having an opening and adapted to contain a plurality of pictures, a divider plate insertible into said chamber in the plane of said opening and dividing said chamber into a picture supply compartment and a picture storage compartment, a reciprocable picture slide in said supply compartment adjacent said divider plate, a picture frame mounted in a viewing position outside said opening and movable to register with said opening on either side of said divider plate, means on said slide engageable with a picture adjacent said divider plate to move said picture out of said supply compartment into said frame, means on said slide for moving a picture from said frame through said opening into said storage compartment, and means actuated by the reciprocating movement of said slide to move said frame alternately to different sides of said divider plate.

4. A picture viewer comprising a chamber having a transverse opening and adapted to contain a plurality of pictures stacked face to face, a divider plate insertible into said chamber in the plane of said opening and forming a transverse partition in said chamber, a reciprocable picture slide adjacent said divider plate movable into and out of said chamber, means on said slide engageable with a picture adjacent said divider plate to move said picture through said opening to a viewing position outside said chamber, a movable picture frame mounted in a viewing position outside said opening to receive pictures from said chamber, means actuated by the reciprocating movement of said slide to move said frame alternately to different sides of said divider plate, and means on said slide for moving a picture from said frame through said opening into said chamber.

5. A picture viewer comprising a chamber having a transverse opening and adapted to contain a plurality of pictures stacked face to face, a divider plate insertible into said chamber in the plane of said opening and forming a transverse partition in said chamber, a reciprocable picture slide adjacent said divider plate movable into and out of said chamber, means on said slide engageable with a picture adjacent said divider plate to move said picture through said opening to a viewing position outside said chamber, a pivoted picture frame mounted in a viewing position outside said opening to receive pictures from said chamber, means actuated by the reciprocating movement of said slide to swing said frame on its pivot alternately to different sides of said divider plate, and means on said slide for moving a picture from said frame through said opening into said chamber.

6. A picture viewer comprising a chamber having a transverse opening and adapted to contain a plurality of pictures stacked face to face, a divider plate insertible into said chamber in the place of said opening and forming a transverse partition in said chamber, a reciprocable picture slide adjacent said divider plate movable into and out of said chamber, means on said slide engageable with a picture adjacent said divider plate to move said picture through said opening to a viewing position outside said chamber, a movable picture frame mounted outside said opening to receive pictures therefrom, means actuated by the reciprocating movement of said slide to move said frame alternately to different sides of said divider plate, means on said slide for moving a picture from said frame through said opening into said chamber, and means actuated by the reciprocable movement of said slide to vary the size of said opening.

7. A picture viewer comprising a chamber having a transverse opening at the top and adapted to contain a plurality of pictures stacked face to face, a divider plate insertible into said chamber in the plane of said opening and forming a transverse partition in said chamber, a reciprocable picture slide adjacent said divider plate movable up and down independently of the latter in the transverse plane of said opening, means on said slide engageable with a picture adjacent said divider plate to raise said picture through said opening, a movable picture frame mounted above the opening in said chamber to receive pictures therefrom, means actuated by the reciprocating movement of said slide to move said frame alternately to different sides of said divider plate, and means on said slide for lowering a picture through said frame.

8. A picture viewer comprising a chamber having a transverse opening at the top and adapted to contain a plurality of pictures stacked face to face, a divider plate insertible into said chamber in the plane of said opening and forming a transverse partition in said chamber, a reciprocable picture slide adjacent said divider plate movable up and down independently of the latter in the transverse plane of said opening and having means engageable with a picture adjacent said divider plate to raise said picture through said opening, a movable picture frame mounted above the opening in said chamber to receive pictures therefrom, means actuated by the reciprocating movement of said slide to move said frame alternately to different sides of said divider plate, means on said slide for lowering a picture through said frame, and means actuated by the reciprocable movement of said slide to vary the size of said opening.

9. A picture viewer comprising a chamber having a transverse opening at the top and adapted to contain a plurality of pictures stacked face to face, a divider plate insertible into said chamber in the plane of said opening and forming a transverse partition in said chamber, a reciprocable picture slide adjacent said divider plate movable up and down independently of the latter in the transverse plane of said opening and having means engageable with a picture adjacent said divider plate to raise said picture through said opening, a movable picture frame mounted above the opening in said chamber, means actuated by the reciprocating movement of said slide to move said frame alternately to different sides of said divider plate, means on said slide for lowering a picture through said frame, and a movable adapter member above said chamber actuated by the descent of said slide to partly close the portion of said opening traversed by said slide and adapt said opening to the passage of relatively thin pictures, said adapter member being engageable and movable by relatively thick ascending pictures to increase the effective size of said opening.

10. A picture viewer comprising an elongated open-ended magazine chamber having a transverse opening at the top, a picture magazine having side and end walls insertible through the open end of said chamber and adapted to contain a plurality of pictures stacked face to face therein, means for forcing said pictures toward one end of said magazine, a divider plate movable up and down in said chamber and magazine in the plane of said top opening and adapted in its down position to clear said chamber to admit said magazine thereto, means for securing said divider plate in raised position forming a transverse partition in said magazine, a reciprocable picture slide adjacent said divider plate movable up and down independently of the latter in the transverse plane of said top opening and having means engageable with the picture nearest said divider plate to raise said picture through said top opening, a movable picture frame mounted above the transverse opening in the top of said magazine chamber, means actuated by the reciprocating movement of said slide to move said frame alternately to different sides of said divider plate, and means on said slide for lowering a picture through said frame.

11. A picture viewer comprising an elongated open-ended magazine chamber having a transverse opening at the top, a picture magazine having side and end walls insertible through the open end of said chamber and adapted to contain a plurality of pictures stacked face to face therein, means for forcing said pictures toward one end of said magazine, a divider plate movable up and down in said chamber and magazine in the plane of said top opening and adapted in its down position to clear said chamber to admit said magazine thereto, means for securing said divider plate in raised position forming a transverse partition in said magazine, a reciprocable picture slide adjacent said divider plate movable up and down independently of the latter in the transverse plane of said top opening and having means engageable with the picture nearest said divider plate to raise said picture through said top opening, a movable picture frame mounted transversely above said magazine chamber to receive a picture ascending through said top opening, means actuated by the downward movement of said slide to move said frame in one direction to receive the picture on one side of said divider plate, means actuated by the upward movement of said slide to move said frame in the opposite direction to present the picture therein on the other side of said divider plate, and means on said slide for lowering a picture through said frame.

12. A picture viewer comprising an elongated open-ended magazine chamber having a transverse opening at the top, a picture magazine having side and end walls insertible through the open end of said chamber and adapted to contain a plurality of pictures stacked face to face therein, means for forcing said pictures toward one end of said magazine, a divider plate movable up and down in said chamber and magazine in the plane of said top opening and adapted in its down position to clear said chamber to admit said magazine thereto, means for securing said divider plate in raised position forming a transverse partition in said magazine, a reciprocable picture slide adjacent said divider plate movable up and down independently of the latter in the transverse plane of said top opening and having means engageable with the picture nearest said divider plate to raise said picture through said top opening, a picture exhibiting carriage shiftable in a longitudinal direction above said magazine chamber, a picture frame on said carriage mounted transversely of said magazine chamber to receive a picture ascending through said top opening, means on said carriage actuated by the downward movement of said slide to shift said carriage and frame longitudinally in one direction to receive the picture on one side of said divider plate, means on said carriage actuated by the upward movement of said slide to shift said carriage and frame longitudinally in the opposite direction to present the picture therein on the other side of said divider plate, and means on said slide for lowering a picture through said frame.

13. A picture viewer comprising an elongated open-ended magazine chamber having a transverse opening at the top, a picture magazine having side and end walls insertible through the open end of said chamber and adapted to contain a plurality of pictures stacked face to face therein, means for forcing said pictures toward one end of said magazine, a divider plate movable up and down in said chamber and magazine in the plane of said top opening and adapted in its down position to clear said chamber to admit said magazine thereto, means for securing said divider plate in raised position forming a transverse partition in said magazine, a reciprocable picture slide adjacent said divider plate movable up and down independently of the latter in the transverse plane of said top opening and having means engageable beneath the picture nearest said divider plate to raise said picture through said top opening, a picture exhibiting carriage shiftable in a longitudinal direction above said magazine chamber, a picture frame on said carriage mounted transversely of said magazine chamber to receive a picture ascending through said top opening, a cross-bar on the top of said picture slide, means on said carriage engageable with said cross-bar in the down position of said slide to shift said carriage and frame longitudinally in one direction to receive the picture on one side of said divider plate, means on said carriage engageable with said cross-bar in the raised position of said slide to shift said carriage and frame longitudinally in the opposite direction to present the picture therein on the other side of of said divider plate, and means on said slide for lowering a picture through said frame.

14. A picture viewer comprising an elongated open-ended magazine chamber having a transverse opening at the top, a picture magazine having side and end walls insertible through the open end of said chamber and adapted to contain a plurality of pictures stacked face to face therein, means for forcing said pictures toward one end of said magazine, a divider plate movable up and down in said chamber and magazine in the plane of said top opening and adapted in its down position to clear said chamber to admit said magazine thereto, means for securing said divider plate in raised position forming a transverse partition in said magazine, a reciprocable picture slide adjacent said divider plate movable up and down independently of the latter in the transverse plane of said top opening and having an edge portion engageable beneath the picture nearest said divider plate to raise said picture through said top opening, a picture exhibiting carriage shiftable in a longitudinal direction above said magazine chamber, a picture frame on said carriage including cooperating inverted U-shaped members mounted transversely of said magazine chamber to receive a picture ascending through said top opening, a cross-bar on the top of said picture slide, a lower cam surface on said carriage engageable with said cross-bar in the down position of said slide to shift said carriage and frame longitudinally in one direction to receive the picture on one side of said divider plate, an upper cam surface on said carriage engageable with said cross-bar in the raised position of said slide to shift said carriage and frame longitudinally in the opposite direction to present the picture therein on the other side of said divider plate, and means on said slide for lowering a picture through said frame.

15. A picture viewer comprising an elongated open-ended magazine chamber having a transverse opening at the top, a picture magazine having side and end walls insertible through the open end of said chamber and adapted to contain a plurality of pictures stacked face to face therein, means for forcing said pictures toward one end of said magazine, a flat-faced divider plate movable up and down in said chamber and magazine in the plane of said top opening and adapted in its retracted position to clear said chamber to admit said magazine thereto, means for positioning the inner face of one end wall of said magazine adjacent the plane of said plate, the said end wall of said magazine being shaped at the bottom to form a space facilitating the ascent of said plate between said wall and the adjacent picture, means for securing said divider plate in raised position forming a transverse partition in said magazine, a reciprocable picture slide adjacent said divider plate movable up and down independently of the latter in the transverse plane of said top opening and having an edge portion engageable beneath the picture nearest said divider plate to raise said picture through said top opening, a picture exhibiting carriage shiftable in a longitudinal direction above said magazine chamber, a picture frame on said carriage including cooperating inverted U-shaped members mounted transversely of said magazine chamber to receive a picture ascending through said top opening, a cross-bar on the top of said picture slide, a lower cam surface on said carriage engageable with said cross-bar in the down position of said slide to shift said carriage and frame longitudinally in one direction to receive the picture on one side of said divider plate, an upper cam surface on said carriage engageable with said cross-bar in the raised position of said slide to shift said carriage and frame longitudinally in the opposite direction to present the picture therein on the other side of said divider plate, and means on said slide for lowering a picture through said frame.

16. A picture viewer comprising an elongated open-ended magazine chamber having a transverse opening at the top, a picture magazine having side and end walls insertible through the open end of said chamber and adapted to contain a plurality of pictures stacked face to face therein, means for forcing said pictures toward one end of said magazine, a divider plate movable up and down in said chamber and magazine in the plane of said top opening and adapted in its retracted position to clear said chamber to admit said magazine thereto, means for securing said divider plate in raised position forming a transverse partition in said magazine, a reciprocable picture slide adjacent said divider plate movable up and down independently of the latter in the transverse plane of said top opening and having an edge portion engageable beneath the picture nearest said divider plate to raise said picture through said top opening, a picture exhibiting carriage shiftable in a longitudinal direction above said magazine chamber, a picture frame on said carriage including cooperating inverted U-shaped members mounted transversely of said magazine chamber to receive a picture ascending through said top opening, a cross-bar on the top of said picture slide, a lower cam surface on said carriage engageable with said cross-bar in the down position of said slide to shift said carriage and frame longitudinally in one direction to receive the picture on one side of said divider plate, an upper cam surface on said carriage engageable with said cross-bar in the raised position of said slide to shift said carriage and frame longitudinally in the opposite direction to present the picture therein on the other side of said divider plate, means on said slide for lowering a picture through said frame, and a pivoted adapter member above said magazine chamber actuated by the descending slide to partly close the portion of said transverse opening traversed by said slide and adapt said opening to the passage of relatively thin pictures, said adapter member being engageable and movable by relatively thick ascending pictures to increase the effective size of said opening.

17. A picture viewer comprising an elongated open-ended magazine chamber having a transverse opening at the top, a picture magazine having side and end walls insertible through the open end of said chamber and adapted to contain a plurality of pictures stacked face to face therein, means for forcing said pictures toward one end of said magazine, a flat-faced divider plate movable up and down in said chamber and magazine in the plane of said top opening and adapted in its retracted position to clear said chamber to admit said magazine thereto, means for positioning the inner face of one end wall of said magazine adjacent the plane of said plate, the said end wall of said magazine being shaped at the bottom to form a space facilitating the ascent of said plate between said wall and the adjacent picture, means for securing said divider plate in raised position forming a transverse partition in said magazine, a reciprocable picture slide adjacent said divider plate movable up and down independently of the latter in the transverse plane of said top opening and having an edge portion engageable beneath the picture nearest said divider plate to raise said picture through said top opening, a picture exhibiting carriage shiftable in a longitudinal direction above said magazine chamber, a picture frame on said carriage including cooperating inverted U-shaped members mounted transversely of said magazine chamber to receive a picture ascending through said top opening, a cross-bar on the top of said picture slide, a lower cam surface on said carriage engageable with said cross-bar in the down position of said slide to shift said carriage and frame longitudinally in one direction to receive the picture on one side of said divider plate, an upper cam surface on said carriage engageable with said cross-bar in the raised position of said slide to shift said carriage and frame longitudinally in the opposite direction to present the picture therein on the other side of said divider plate, means on said slide for lowering a picture through said frame, and a pivoted adapter member above said magazine chamber actuated by the descending slide to partly close the portion of said transverse opening traversed by said slide and adapt said opening to the passage of relatively thin pictures, said adapter member being engageable and movable by relatively thick ascending pictures to increase the effective size of said opening.

18. A picture viewer comprising an elongated open-ended magazine chamber having a transverse opening at the top, a picture magazine having side and end walls insertible through the open end of said chamber and adapted to contain a plurality of pictures stacked face to face therein, a longitudinally adjustable spring-actuated pressure member in said magazine engageable with an end picture of the stack to force said stack toward the opposite end of the magazine, a flat-faced divider plate movable up and down in said chamber and magazine in the plane of said top opening and adapted in its retracted position to clear said chamber to admit said magazine thereto, means for positioning the inner face of one end wall of said magazine adjacent the plane of said plate, the said end wall of said magazine being offset at the bottom and forming a space to facilitate the ascent of said plate between said wall and the adjacent picture, means for securing said divider plate in raised position forming a transverse partition in said magazine, a reciprocable picture slide adjacent said divider plate movable up and down independently of the latter in the transverse plane of said top opening and having an edge portion engageable beneath the picture nearest said divider plate to raise said picture through said top opening, a picture exhibiting carriage shiftable in a longitudinal direction above said magazine chamber, a picture frame on said carriage including cooperating inverted U-shaped members mounted transversely of said magazine chamber to receive a picture ascending through said top opening, a cross-bar on the top of said picture slide, a lower cam surface on said carriage engageable with said cross-bar in the down position of said slide to shift said carriage and frame longitudinally in one direction to receive the picture on one side of said divider plate, an upper cam surface on said carriage engageable with said cross-bar in the raised position of said slide to shift said carriage and frame longitudinally in the opposite direction to present the picture therein on the other side of said divider plate, means on said slide for lowering a picture through said frame, and a pivoted adapter member above said magazine chamber actuated by the descending slide to partly close the portion of said transverse opening traversed by said slide and adapt said opening to the passage of relatively thin pictures, said adapter member being engageable and movable by relatively thick ascending pictures to increase the effective size of said opening.

19. A picture viewer comprising an elongated open-ended magazine chamber having a transverse opening at the top, a picture magazine having side and end walls insertible through the open end of said chamber and adapted to contain a plurality of pictures stacked face to face therein, a longitudinally adjustable spring-actuated pressure member in said magazine engageable with an end picture of the stack to force said stack toward the opposite end of the magazine, means for adjusting said pressure member to vary the effective interior length of said magazine according to the number of pictures in said stack, a flat-faced divider plate movable up and down in said chamber and magazine in the plane of said top opening and adapted in its retracted position to clear said chamber to admit said magazine thereto, means on one end wall of said magazine engageable with the retracted divider plate and positioning the inner face of such wall adjacent the plane of said plate, the said end wall of said magazine being offset at the bottom and forming a space to facilitate the ascent of said plate between said wall and the adjacent picture, means for securing said divider plate in raised position forming a transverse partition in said magazine, a reciprocable picture slide adjacent said divider plate movable up and down independently of the latter in the transverse plane of said top opening and having an edge portion engageable beneath the picture nearest said divider plate to raise said picture through said top opening, a picture exhibiting carriage shiftable in a longitudinal direction above said magazine chamber, a picture frame on said carriage including cooperating inverted U-shaped members mounted transversely of said magazine chamber to receive a picture ascending through said top opening, a cross-bar on the top of said picture slide, a lower cam surface on said carriage engageable with said cross-bar in the down position of said slide to shift said carriage and frame longitudinally in one direction to receive the picture on one side of said divider plate, an upper cam surface on said carriage engageable with said cross-bar in the raised position of said slide to shift said carriage and frame longitudinally in the opposite direction to present the picture therein on the other side of said divider plate, means on said slide for lowering a picture through said frame, and a pivoted adapter member above said magazine chamber actuated by the descending slide to partly close the portion of said transverse opening traversed by said slide and adapt said opening to the passage of relatively thin pictures, said adapter member being engageable and movable by relatively thick ascending pictures to increase the effective size of said opening.

20. A picture viewer comprising an elongated open-ended magazine chamber having a transverse opening at the top, a picture magazine having side and end walls insertible through the open end of said chamber and adapted to contain a plurality of pictures stacked face to face therein, a longitudinally adjustable spring-actuated pressure member in said magazine engageable with an end picture of the stack to force said stack toward the opposite end of the magazine, releasable detents on said pressure member engageable with the side walls of said magazine to vary the effective interior length of said magazine according to the number of pictures in said stack, a flat-faced divider plate movable up and down in said chamber and magazine in the plane of said top opening and adapted in its retracted position to clear said chamber to admit said magazine thereto, a stop member on one end wall of said magazine engageable with the retracted divider plate and positioning the inner face of such wall adjacent the plane of said plate, the said end wall of said magazine being offset at the bottom and forming a space to facilitate the ascent of said plate between said wall and the adjacent picture, means for securing said divider plate in raised position forming a transverse partition in said magazine, a reciprocable picture slide adjacent said divider plate movable up and down independently of the latter in the transverse plane of said top opening and having an edge portion engageable beneath the picture nearest said divider plate to raise said picture through said top opening, a picture exhibiting carriage shiftable in a longitudinal direction above said magazine chamber, a picture frame on said carriage including cooperating inverted U-shaped members mounted transversely of said magazine chamber to receive a picture ascending through said top opening, a cross-bar on the top of said picture slide, a lower cam surface on said carriage engageable with said cross-bar in the down position of said slide to shift said carriage and frame longitudinally in one direction to receive the picture on one side of said divider plate, an upper cam surface on said carriage engageable with said cross-bar in the raised position of said slide to shift said carriage and frame longitudinally in the opposite direction to present the picture therein on the other side of said divider plate, means on said slide for lowering a picture through said frame, and a pivoted adapter member above said magazine chamber actuated by the descending slide to partly close the portion of said transverse opening traversed by said slide and adapt said opening to the passage of relatively thin pictures, said adapter member being engageable and movable by relatively thick ascending pictures to increase the effective size of said opening.

ALEXANDER C. PARLINI.
EUGENE HASCHER.
HEINZ RECKER.

REFERENCES CITED

The following references are of record in the file of this patent:

UNITED STATES PATENTS

| Number | Name | Date |
| --- | --- | --- |
| 998,305 | Roebuck | July 18, 1911 |
| 1,159,681 | Kastner | Nov. 9, 1915 |
| 2,427,164 | Stechbart | Sept. 9, 1947 |
| 2,460,359 | Page | Feb. 1, 1949 |